United States Patent [19]

Havera et al.

[11] 3,835,151
[45] Sept. 10, 1974

[54] DIPHENYLHYDANTOIN DERIVATIVE

[75] Inventors: Herbert John Havera, Edwardsburg, Mich.; Wallace Glenn Strycker, Goshen, Ind.

[73] Assignee: Miles Laboratories, Inc., Elkhart, Ind.

[22] Filed: Apr. 16, 1973

[21] Appl. No.: 351,319

[52] U.S. Cl............................. 260/309.5, 424/273
[51] Int. Cl........................................... C07d 49/36
[58] Field of Search................................ 260/309.5

[56] References Cited
OTHER PUBLICATIONS

Fontanella, Chem. Abst., Vol. 73, No. 56022h (1970), QD 1.A51.

Sandberg, Chem. Abst., Vol. 46, Column 4122, (1952), QD 1.A51.

Schloegl et al., Chem Abst., Vol. 56, Columns 7299–7301 (1962), QD1.A51

Winstead et al., Chem. Abst., Vol. 62, Column 5268, (1965), QD1.A51.

*Primary Examiner*—Natalie Troosof

[57] ABSTRACT

N-(2-diethylamino)ethyl-α-(5,5-diphenylhydantoin-3-yl)acetamide and nontoxic salts thereof exhibit antiarrhythmic activity in mammals.

2 Claims, No Drawings

DIPHENYLHYDANTOIN DERIVATIVE

BACKGROUND OF THE INVENTION

1. Field of the Invention

Cardiac arrhythmias are disorders of impulse generation in the mammalian heart. Although the physiological mechanisms of these disorders are not completely understood, they are believed to result from disruptions of normal cardiac pacemaker activity, distrubances in the cardiac conductive fibers, or a combination of the former and latter factors. Cardiac arrhythmias of clinical significance in man include: (A) premature contractions (extrasystoles) having their origin in abnormal focal points in the atria or ventricles, (B) paroxysmal supraventricular tachycardia, (C) atrial flutter, (D) atrial fibrillation, (E) ventricular tachycardia, and (F) ventricular fibrillation. These arrhythmias can be induced in experimental animals to study physiological mechanisms involved or to screen new antiarrhythmic agents.

Arrhythmias are treated clinically by administration of a variety of drugs, although quinidine and procainamide are current mainstays. Quinidine is the d-isomer of quinine while procainamide is p-amino-N-(2-diethylamino-ethyl)-benzamide. Both drugs require extreme care in administration and are considered relatively dangerous. In weighing their efficacy over their danger, however, the former is countervailing. Because of such limitations in currently available antiarrhythmic drugs, there have been efforts to discover safer substitutes. The discovery of the antiarrhythmic activity of hydantoin opened new approaches in the design of new compounds exhibiting such activity. For a general discussion of this field, to which the instant invention pertains, refer to — G. K. Moe and J. A. Albildskov, "Antiarrhythmic Drugs," in: *The Pharmacological Basis of Therapeutics*, L. S. Goodman and A. Gilman, Editors, 4th Edition, The MacMillan Company, New York, Chapter 32 (1970).

2. Description of the Prior Art

U.S. Pat. No. 2,409,754 (1954) discloses the synthesis and structure of diphenylhydantoin (5,5-diphenyl-2,4-imidazolidinedione):

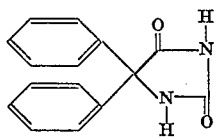

Diphenylhydanatoin (hereafter referred to as DPH) was utilized initially in the treatment of epilepsy, but was discovered later to have important antiarrhythmic applications. Of particular interest to scientists and clinicians was that the pharmacodynamics of DPH differed from quinidine and procainamide, and that DPH did not exhibit the dangerous properties of its precursors. DPH was found specifically to antagonize ventricular arrhythmias induced by digitalis. In its action on the heart, DPH depresses ventricular automaticity, enhances atrio-ventricular nodal conduction, and reduces the effective refractory period. DPH, however, is not without untoward side effects: dizziness, nausea, emesis, nystigmus, and ataxia. Large doses may produce atrioventricular blockage, bradycardia, or even cardiac arrest. For a review of the current status of DPH as an antiarrhythmic agent, see — L. S. Dreifus and Y. Watanabe, Amer. Heart J., 80: 709–713 (1970).

There have been several attempts to improve the activity and to eliminate the side effects of DPH. H. R. Henze and A. F. Isbell (J. Amer. Chem. Soc., 76: 4152–4156 [1954]) described twelve 5-(substituted-phenyl)- and 5,5-di(substituted-phenyl)-hydantoins. Of these compounds, only 5-(4-aminophenyl)-5-phenylhydantoin displayed activity, but only to the extent of 50 percent of DPH.

W. Chiti and P. Chiarini (Il Farmaco, Sci. Ed., 13: 579–589 [1958]) reported the synthesis of seventeen derivatives of DPH. Of particular interest, are the following three compounds whose activity is compared to the derivative described in the instant application:

A. 3-(3-diethylaminopropyl)-5,5-diphenylhydantoin,

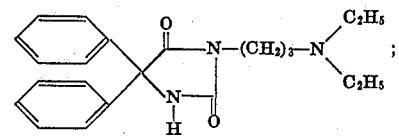

B. 3-[3-(1-piperidyl)propyl]-5,5-diphenylhydantoin,

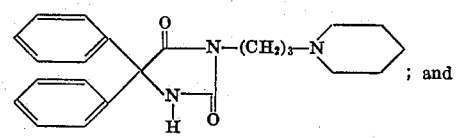

; and

C. 3-(3-morpholinopropyl)-5,5-diphenylhydantoin,

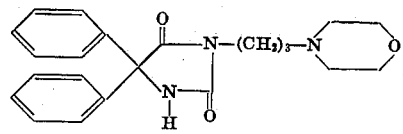

The Chiti and Chiarini molecules, however, are rather toxic.

The compound disclosed in the present application is more effective and less toxic than the above prior art compounds.

SUMMARY OF THE INVENTION

N-(2-diethylamino)ethyl-α-(5,5-diphenylhydantoin-3-yl)acetamide has the following structural formula:

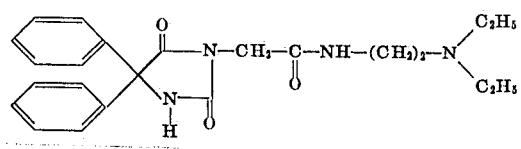

This compound and nontoxic, pharmaceutically acceptable salts thereof can be prepared via the following synthetic pathway wherein X represents chlorine or bromine, and R is -NH-(CH$_2$)$_2$N(C$_2$H$_5$)$_2$:

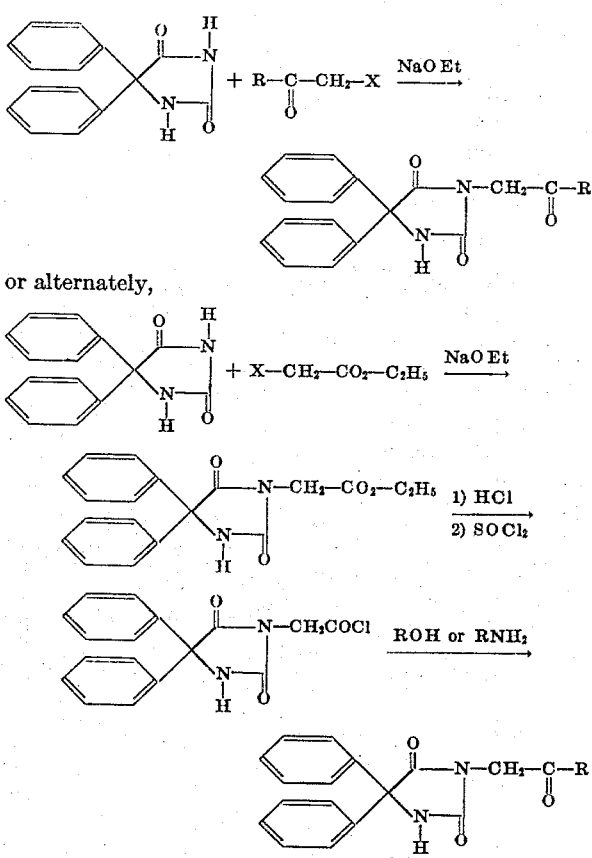

The starting material, diphenylhydantoin, can be synthesized according to the procedure described in U.S. Pat. No. 2,409,754 (1946) or by the process described in J. Prakt. Chem., 141: 5 (1934), i.e., reacting benzophenone and acetamide in the presence of potassium cyanide.

N-(2-diethylamino)ethyl-α-(5,5-diphenylhydantoin-3-yl)acetamide and nontoxic salts thereof are useful in the treatment of cardiac arrhythmias. This compound and its nontoxic salts, especially the hydrochloride salt thereof, is approximately ten times (10X) more effective in antiarrhythmic activity than diphenylhydantoin. In comparison with other 3-substituted-diphenylhydantoins, the compound of the present invention produces less cardiac depression and possesses less toxicity.

An experimental animal or a human being with cardiac arrhythmias can be treated by administering thereto an effective amount of N-(2-diethylamino)ethyl-α-(5,5-diphenyl-hydantoin-3-yl)acetamide or a nontoxic salt thereof. An effective amount can range from 50 mg to 500 mg per day depending on the severity of the arrhythmia.

Dose forms of the compound disclosed herein can be conveniently prepared by combining the compounds with nontoxic vehicles generally utilized in the pharmaceutical art. Doses can be prepared in a solid or liquid state for oral, parenteral, or intravenous administration.

DESCRIPTION OF THE PREFERRED EMBODIMENTS

Example 1

Preparation of N-(2-Diethylamino)Ethyl-α-(5,5-Diphenyl hydantoin-3-yl)Acetamide Hydrochloride A mixture of 3-carboxymethyl-5,5-diphenylhydantoin (9.3 g, 0.03 mole) dissolved in 50 ml of SOCl$_2$ was heated on a steam bath for 1 hour. This reaction mixture was then concentrated in vacuo to an oil. The oil was stirred in dry tetrahydrofuran while 3.4 g of N,N-diethylethylene-diamine was adeed slowly. This mixture was warmed for thirty minutes and subsequently concentrated. The concentrated material was dissolved in methanol-ether, and N-(2-diethylamino)ethyl-α-(5,5-diphenylhydantoin-3-yl) acetamide hydrochloride was obtained in crystalline form. Subsequent recrystallization from methanol-ether yielded the purified compound. The yield was 4.0 g (30 percent). The purified compound had a melting point of 243°–244°.

| Analysis | | |
|---|---|---|
| Calculated | (C$_{23}$H$_{28}$N$_4$O$_3$·HCl): | C, 62.08; H, 6.57; N, 12.59 |
| Found | : | C, 62.12; H, 6.65; N, 12.80 |

EXAMPLE 2

Antiarrhythmic Activity of N-(2-Diethylamino)Ethyl-α-(5,5-Diphenylhydantoin-3-yl)Acetamide Hydrochloride In Examples 2 and 3 Compound A refers to N-(2-diethyl-amino)ethyl-α-(5,5-diphenylhydantoin-3-yl)acetamide hydrochloride, Compound B represents 3-(3-diethylamino-propyl)-5,5-diphenylhydantoin, Compound C denotes 3-[3-(1-piperidyl)propyl]-5,5-diphenylhydantoin, Compound D is 3-(3-morpholino-propyl)-5,5-diphenylhydantoin, and Compound E designates diphenylhydantoin.

The antiarrhythmic activity of Compound A was compared to the reference compounds listed above in the experimental model reported by J.W. Lawson (J. Pharmacol. Exp. Therap., 160: 22–31 [1968]).

The test compounds were administered to groups consisting of 5 mice in varying intraperitoneal doses. Ten minutes after administration of a given dose of a compound, a mouse was transferred to a covered 300 ml glass beaker which contained a wad of cotton saturated with about 20 ml of chloroform. The animal was observed closely and removed from the beaker immediately after respiratory arrest. The heart was quickly exposed by making an incision through the abdomen, diaphragm, thorax and pericardium for visual inspection of ventricular rate and rhythm. Ventricular contractions were counted for 30 seconds. According to the procedure reported by Lawson, animals with a ventricular rate not exceeding 100 contractions during the 30 second observation period were considered protected. Results obtained with each dose were used to calculate the mean effective doses (ED$_{50}$) after the method of Litchfield and Wilcoxon (J. Pharmacol. Exp. Therap. 96: 99–113 [1949]). Deaths occurring after administration of each dose but before exposure to chloroform were noted in order to determine the minimum lethal dose for each compound. The results are shown in Table 1.

Table I

| Compound | $ED_{50}$ (95% CL) | MLD | MLD/$ED_{50}$ |
|---|---|---|---|
| A | 24 (13–45) | >100 | >4.17 |
| B | 14 (8–26) | 56 | 4.00 |
| C | 19 (11–35) | 31 | 1.63 |
| D | 76 (35–163) | 178 | 2.34 |
| E | 394 (296–529) | 1000 | 2.54 |

$ED_{50}$ (95% CL) is the mean effective dose in mg/kg, intraperitoneally; 95% CL is the confidence limits in mg/kg.
MLD is the Minimum Lethal Dose in mg/kg, intraperitoneally.
MLD/$ED_{50}$ is a Therapeutic Index calculated with Minimum Lethal Dose Data.

EXAMPLE 3

Effect of N-(2-Diethylamino)Ethyl-α-(5,5-Diphenylhydantoin-3-yl)Acetamide Hydrochloride on the Atrial Refractory Period The effect of the compounds listed in Example 2 on refractory period in the atrium was determined indirectly by the procedure described by Dawes (Brit. J. Pharmacol., 1: 90–112, [1946]). Guinea pig atria, suspended in an isolated organ chamber, were stimulated electrically at increasing frequencies while the resulting mechanical contractions were recorded. The minimum interval between two consecutive stimuli necessary for eliciting a mechanical response was determined before and after incubation with varying concentrations of the test compounds. The minimum interval thus determined is an indirect measure of the refractory period in the tissue, and a prolongation of this interval indicates an increased refractory period. From the increase in minimum interval observed with each concentration, the amount necessary for increasing the interval by 50 percent over control values ($ED_{50}$) was determined for each compound. As shown in Table II, Compounds B, C and D were very effective in prolonging atrium refractory period, while Compounds A and E were much less active.

Table II

| Compound | $EC_{50}$, mcg/ml |
|---|---|
| A | 18.9 |
| B | 0.5 |
| C | 0.6 |
| D | 1.1 |
| E | 20.0 |

What is claimed is:

1. A compound selected from the group consisting of N-(2-diethylaminoethyl-α-(5,5-diphenylhydantoin-3-yl)-acetamide and nontoxic, pharmaceutically acceptable salts thereof.

2. A compound as in claim 1: N-(2-diethylamino)ethyl-α-(5,5-diphenylhydantoin-3-yl)-acetamide hydro-chloride.

* * * * *